United States Patent [19]

Ostlie

[11] Patent Number: 5,448,968
[45] Date of Patent: Sep. 12, 1995

[54] INFRAACOUSTIC/ELECTRIC FISH FENCE

[76] Inventor: Lars Ostlie, Field Rise Binton Road, Welford on Avon CV37 8PP, England

[21] Appl. No.: 167,991
[22] PCT Filed: Jun. 25, 1992
[86] PCT No.: PCT/NO92/00112
  § 371 Date: Feb. 23, 1994
  § 102(e) Date: Feb. 23, 1994
[87] PCT Pub. No.: WO93/00003
  PCT Pub. Date: Jan. 7, 1993

[30] Foreign Application Priority Data

Jun. 27, 1991 [NO] Norway ............................ 91.2529

[51] Int. Cl.⁶ .............................................. A01K 61/00
[52] U.S. Cl. .............................................. 119/220
[58] Field of Search ................ 119/219, 220; 367/139; 43/17.1

[56] References Cited

U.S. PATENT DOCUMENTS

| | | |
|---|---|---|
| 948,355 | 2/1910 | Tatro et al. . |
| 1,515,547 | 11/1924 | Burkey ........................ 119/220 |
| 2,146,105 | 2/1939 | Baker . |
| 2,485,660 | 10/1949 | Robertson . |
| 2,709,984 | 6/1955 | Marks ........................ 119/220 |
| 2,745,205 | 5/1956 | Kafka ........................ 43/17.1 |
| 2,836,735 | 5/1958 | Kreutzer . |
| 3,180,047 | 4/1965 | Kreutzer ........................ 43/17.1 |
| 3,363,356 | 1/1968 | Kreutzer ........................ 43/17.1 |
| 4,646,276 | 2/1987 | Kowalewski et al. ......... 367/139 |
| 4,758,318 | 7/1988 | Yoshida ........................ 47/1.3 X |
| 4,825,810 | 5/1989 | Sharber ........................ 43/17.1 X |
| 4,869,016 | 9/1989 | Diprose et al. ................ 43/124 |
| 5,270,912 | 12/1993 | Sharber et al. ................ 43/17.1 X |
| 5,289,133 | 2/1994 | Kolz ........................... 43/17.1 X |

FOREIGN PATENT DOCUMENTS

| | | |
|---|---|---|
| 1073629 | 1/1960 | Germany . |
| 4-341392 | 11/1992 | Japan . |
| 83894 | 6/1954 | Norway . |
| 140958 | 6/1953 | Sweden . |
| 812124 | 4/1959 | United Kingdom . |
| 480382 | 8/1975 | U.S.S.R. . |
| 513681 | 5/1976 | U.S.S.R. . |
| 1199222 | 12/1985 | U.S.S.R. ..................... 119/220 |

*Primary Examiner*—Robert P. Swiatek
*Attorney, Agent, or Firm*—Wenderoth, Lind & Ponack

[57] ABSTRACT

An immaterial fish fence is based on a combination of low frequency mechanical vibrations and synchronously modulated electric fields, where fish approaching the fence will be given at the same time fear reactions and directional information by mechanical vibrations, and in addition will feel pain due to the electric field. The fish will then turn and swim away. The fence is implemented by means of columns positioned side by side, each comprising a number of low frequency transducers suspended above each other, each column being suspended in a float. Each column also has two electrical conductors to which a high voltage can be delivered. Thus, synchronized fields of both acoustic and electric type can be generated between and around the columns.

15 Claims, 4 Drawing Sheets

INFRAACOUSTIC/ELECTRIC FISH FENCE

BACKGROUND OF THE INVENTION

The present invention relates to fish fence primarily of an immaterial type, based on subsea use of low frequency mechanical (infra acoustic) vibrations in conjunction with an electric field where two such signals are modulated synchronously. The infraacoustic field combined with the electrical field create anxiety reactions in fish. Fish also will feel pain caused by the electric field.

Usually, a fish fence is material, i.e. sometimes a net is used acting as an obstruction for fish exceeding a certain size.

However, in certain cases such a material fence constitutes a problem, e.g. by being a hindrance to other sea traffic, by the fact that the fence is exposed to fouling, as well as by the fact that it is difficult to alter the mesh in order to vary the size of the fish it is desirable to have pass through the fence. Consequently, a different type of fence is needed, for example an immaterial "energy fence", also called "non-physical" fence, of a type to irritate/frighten and cause pain, so as to make fish turn back when about to swim into the fence.

Previously there have been conducted experiments using different forms of both sound and electrical fences, however not in combination. In the majority of experiments where sound has been used, sound pressure has been used, in the sense that the actual sound pressure is used to frighten away the fish or to make the fish stay behind or inside an imaginary barrier.

These experiments to generate sound pressure in water have all been conducted within the hearing range of the fish (i.e. the range 50 Hz–approximately 2000 Hz), audible to fish via otolith and/or swimming bladder, but these methods have proved to be not very effective, for the simple reason that the fish gets used to the sound.

Additionally, several experiments have been performed with electrical fences with an aim at establishing an electrical field in the water. Experiments have been conducted with different frequencies and pulse widths in an alternating electric field and, generally, it can be stated that extremely varied results were achieved. The best results were obtained when using a very short pulse width and frequencies of 50 Hz. In this case a barrier efficiency of approximately 80% was achieved, but small fish were nevertheless able to swim rather easily through the fence, and larger fish were killed. The reason for these problems is that the fish have no organs to indicate from which direction the electric field comes, this resulting in that the fish, upon entering the electric field, will feel pain, but will not be able to detect the reason therefor. Usually it will continue swimming into the field, where it will either be killed or may succeed in passing through (sometimes injured), depending on its physical size.

New investigations show that fish exposed to infraacoustic particle movements (both the acceleration and velocity of the water particles are important) can detect such movements almost down to a frequency of 1 Hz (experiments have been performed down to 3 Hz) with the use of side line organs. In addition to detecting the particle movement (the particle acceleration), the fish is also able to detect the direction.

Fish have such a sensor system as a predator warning, and experiments show that fish exposed to infra acoustic accelerations get spontaneous reactions of fear (under 20 Hz).

Experiments with an infraacoustic fence with a dipole type acceleration pattern can produce relatively good results, but the result is nevertheless too dependant on the surroundings, i.e. factors like stress level (traffic), conditions of food/light and threshold of fear (due to possible pedators in the surroundings).

From U.S. Pat. No. 2,146,105 is previously known electrodes which create electrical dipole fields, but no additional stimulus of the acoustic type to impart fear and direction information to the fish, appears therein.

A combined system, however, is known from U.S. Pat. No. 2,709,984 but this combination relates to light signals and electric influence of the fish from a plurality of electrodes suspended in the water. Correctly, it is stated in such publication that the fish needs a "direction" indicator in addition to the electric shocks sensed, in order to realize in which direction it must swim to avoid the unpleasant effect. However, important differences exist between light and sound regarding such direction indication, as light is a positive stimulus and hence the fish is dependent on training to achieve the desired effect (i.e. the fish must collate a flash of light with a simultaneous electric shock).

However, it would be far more advantageous if an immediate response for the fish could be obtained without any prior learning process.

SUMMARY OF THE INVENTION

The present invention tries to achieve an effective solution to the problem regarding the generation of an immaterial barrier in water in order to stop the approach of the fish, where the sound pressure and intensity of an electric field are not of great importance, but on the contrary infraacoustic particle acceleration in conjunction with a very short and intense electric field modulated synchronously with the infraacoustic field. There is no learning problematics involved, as the fish already from the first try will swim away from the electric field.

It appears namely that when the fish enters the infraacoustic acceleration vector field, it exhibits a fear reaction, and at the same time it feels pain due to a voltage drop across the body as a result of the electric field.

Since the fish is able to detect the acoustic field (which is aligned in parallel with the electric field as discussed below, together with the direction thereof, pain provided by electricity will be perceived as associated with the acoustic field and the direction-found source of the field, and the fish will turn and swim away from what it considers to be a position which is the cause of the pain.

The invention is implemented by a fish fence based on under water use of low frequency mechanical vibrations combined with an additional stimulus, and is particularly characterized by a plurality of electromagnetic low frequency transducers for mechanical vibrations, suspended in vertical columns beneath floats positioned in regular rows in or below the water surface, such transducer configuration constituting a grid, and a corresponding plurality of pairs of parallel-connected electric conductors, each conductor in a pair being positioned close to and along each respective side of a vertical transducer column. The additional or further stimulus an electric field from the conductors, modulated in synchronism with the mechanical vibrations from the transducers. The transducers establish the acoustic field, and the electrodes on each side of the transducers establish the electric field.

The transducers in each column (together with the electrodes) are arranged to oscillate in phase with each other and in opposite phase with the nearest neighboring column in the row (it is also possible to use the alternative that the transducers in a column oscillate in the opposite phase with the next nearest neighboring column. In this way an acoustic field is raised together with an electric field as a row of single dipole configurations in the water between the transducer columns.

In a preferred embodiment of the invention, the transducers are connected to a drive voltage generator the time behavior of which is adapted by a Fourier series to provide maximum water particle acceleration in the area between the transducer columns.

At the same time as the generator generates a pulse, it also generates a synchronizing pulse to a high voltage generator so that it delivers a powerful electric pulse but with a much shorter duration than the acoustic pulse.

This means that the acoustic and electric pulses are modulated synchronously. The fundamental frequencies for both types of pulse are in the infra level, i.e. below 20 Hz. The voltage level and the width of the electric pulse depend on the fish type, the size of the fish and the water conductivity,.

The acoustic generator may preferably be adapted to generate drive voltages for the transducers by:

i) providing a sine curve with the topical fundamental frequency, ii) providing a number of odd harmonic curves with the sine curve as a basis, for example the first, third, fifth and seventh harmonies, and iii) adding these odd harmonics to the sine curve with scaling coefficients chosen from a knowledge of physical parameters of the transducers, in order to create a periodic drive voltage curve with a characteristic time behavior.

The characteristic time behavior of the drive voltage applied to each transducer results in an approximately square shaped time function for the dynamic pressure in the water, and thus the highest possible particle velocity.

Preferably the generator is equipped to deliver the applied drive voltage as well as the same applied drive voltage phase, to every other column in the row, respectively.

The synchronization takes place with the aid of a simple square pulse placed at the highest level of the acoustic pulse (at the leading edge thereof) which square phase at the same time triggers the electric pulse.

As an example, the grid can either be one- or two-dimensional, the one-dimensional grid comprising columns with only one transducer in each column, and the two-dimensional case comprising columns with two or more transducers in each column.

In a special embodiment of the fish fence a regular additional row of columns with only transducers and no electrodes can be used, i.e. this additional row is solely an infraacoustic row producing its own dipole fields.

Preferably, the transducer columns in the first row and in the additional row are placed in two parallel lines, in a view from above, and in such a manner that each column in a row is placed at the summit of an equilateral triangle where two neighboring columns in the other row constitute the end points of the triangle base line, all in a view from above.

The reason for a main row and an additional row (from the front, where the fish is to be barred) is that at the same time it is possible to use hydroacoustic detectors (of the echo sounder or sonar type) which detect fish approaching too near the fence.

Usually, only the acoustic part is switched on, i.e. only the transducers are in operation, the electric part of the system being inactive. When the fish approaches and enters the first row, it is detected at the same time and the electric part of the main row at the back is activated. When the fish enters a first row, i.e. the additional row, the swimming speed is reduced, and it will show signs of fear. When it enters a second row i.e. the main row, it will also experience pain from the electric pulse.

The signal level in the second row is preferably 3 dB higher than in the first row, i.e. the double.

By using "empty" areas, the two rows can be kept acoustically separated, so that the one only to a small extent influences the other.

BRIEF DESCRIPTION OF THE DRAWINGS

A more detailed description of the now will be given of explanatory and non-limitative examples, referring to the appended drawings, wherein.

DETAILED DESCRIPTION OF THE INVENTION

FIG. 1, part A, shows an example of a fish fence according to the present invention. In such example four vertical columns are shown, each with three electromagnetic low frequency transducers 1 adapted to receive signals from a not shown generator and distribution unit.

Figure 1A:
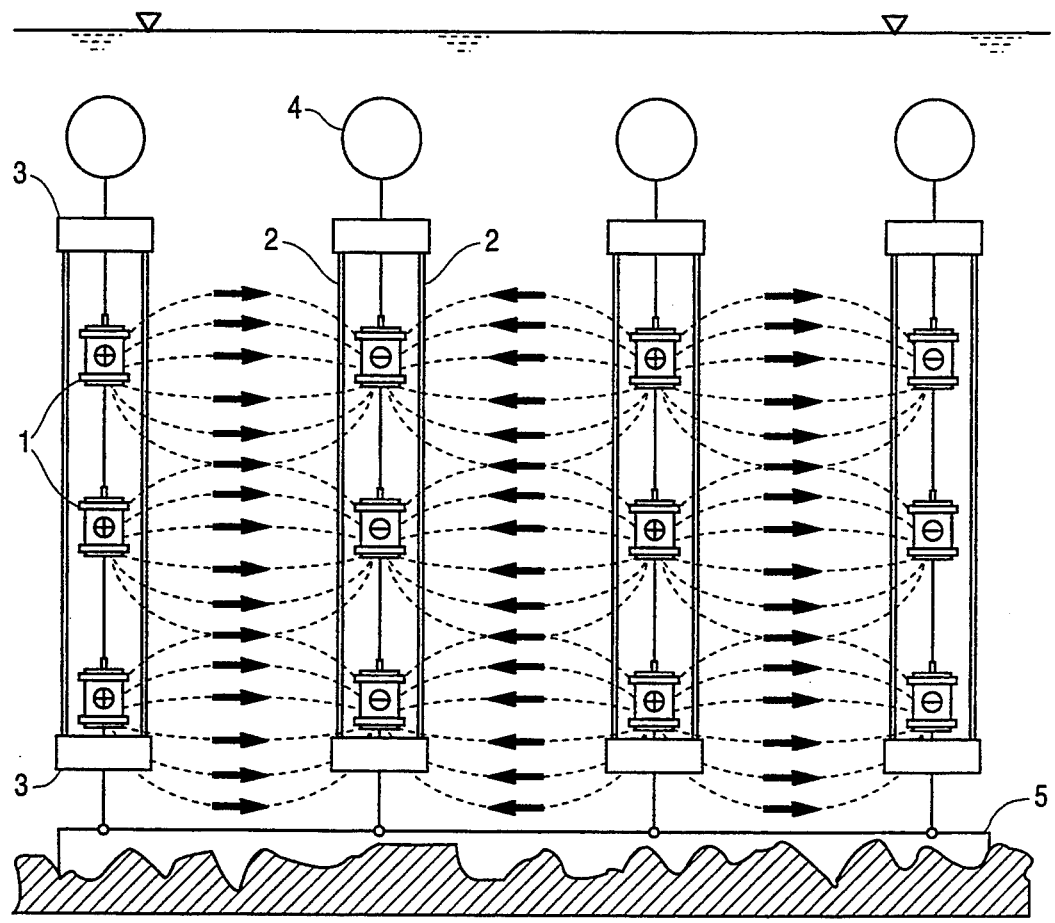
FIG. 1A is a schematic view of a fence grid with transducers and electrodes seen respectively from the side, indications of the acoustic and electric fields also being shown.

Additionally, FIG. 1A shows current electrodes 2, connection boxes 3 for the current electrodes, floats 4 and anchoring on a bottom 5.

Figure 1B:
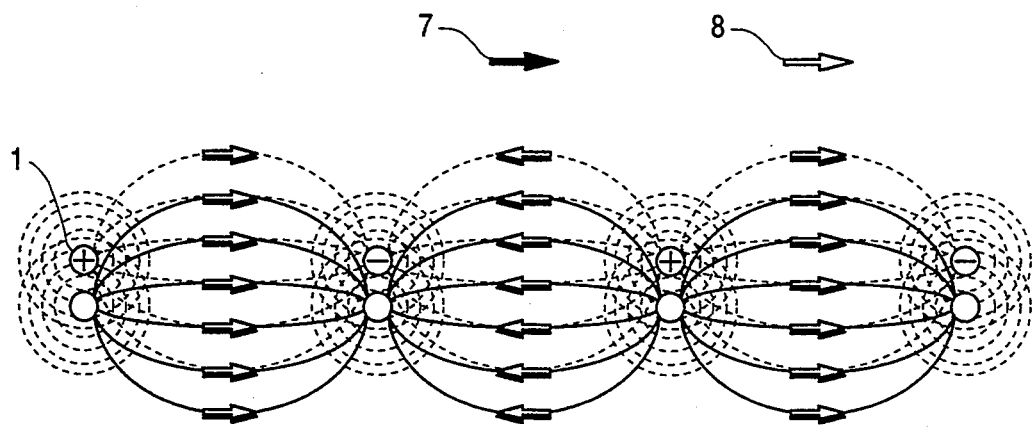
FIG. 1B is a similar view from above.

In FIG. 1B are shown dipole-shaped vector fields between transducers 1 and between electrodes, where a dark arrow 7 indicates acceleration vectors and a lighter arrow 8 indicates electric field vectors which are mainly parallel to acoustic vectors. Around each transducer will appear pressure rings which are largest in one certain direction. Measurements show that the dipole field is relatively narrow, for example at a distance of two meters between each column the dipole field will possibly extend 4–5 meters to each side, while a very intense field arises between the columns.

Figure 2:
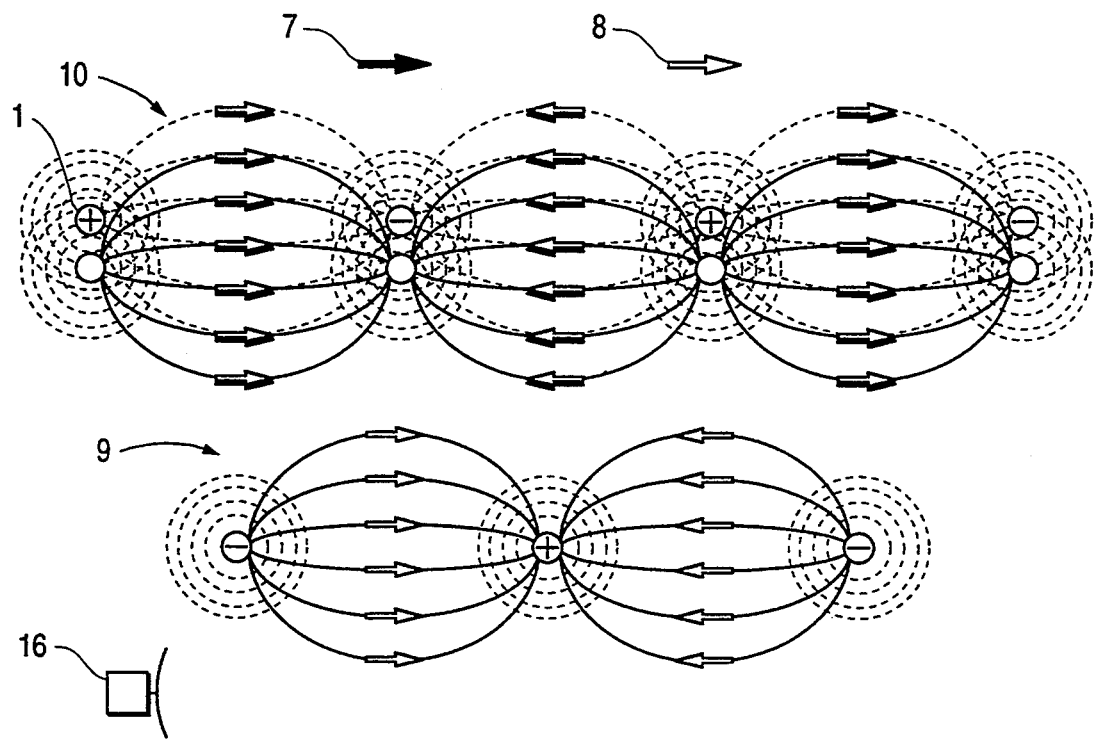
FIG. 2 is a similar view a fence grid seen from above, with an additional row consisting of acoustic transducers alone.

FIG. 2 shows a fish fence with an additional row in front of a main row, where the additional row is solely an acoustic row, while the main row is an acoustic/electric row. In front of both rows there is a hydroacoustic detector 16 which is either of the sonar type or consists of an echo sounder.

Eventually, a fish will enter the zone in front of the additional row where it is detected, and consequently the electric field in the main row will be activated.

The reason that the electric field is not activated all the time is that power consumption can be reduced, and that it is desirable to reduce the danger for mammals and humans who might enter the area of the field.

Figure 3:
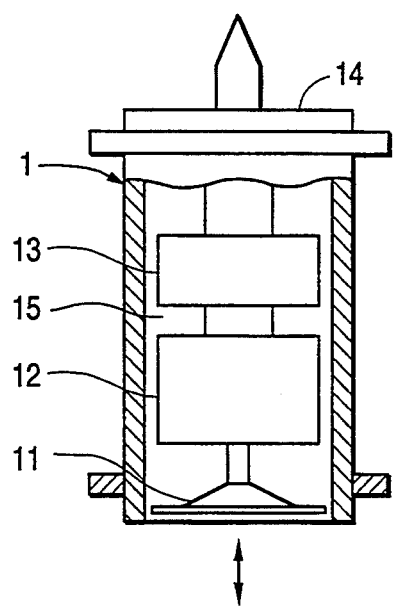
FIG. 3 is a section through an example of an electromagnetic low frequency transducer.

FIG. 3 shows a possible construction of a suitable transducer 1, with a membrane 11 beating up and down and constituting the bottom of the transducer. As will be apparent from FIGS. 1A, 1B and 2, this will create strong particle velocity fields between the columns, as shown with dark arrows. Additionally, the transducer has a top mounted fixing means 14 for cable and suspension, electronic circuitry (amplifier) 13, and a pressure compensated housing so that air 15 inside the transducer has the same pressure as the water. An electromagnetic motor 12 drives the piston/membrane 11.

Figure 4:
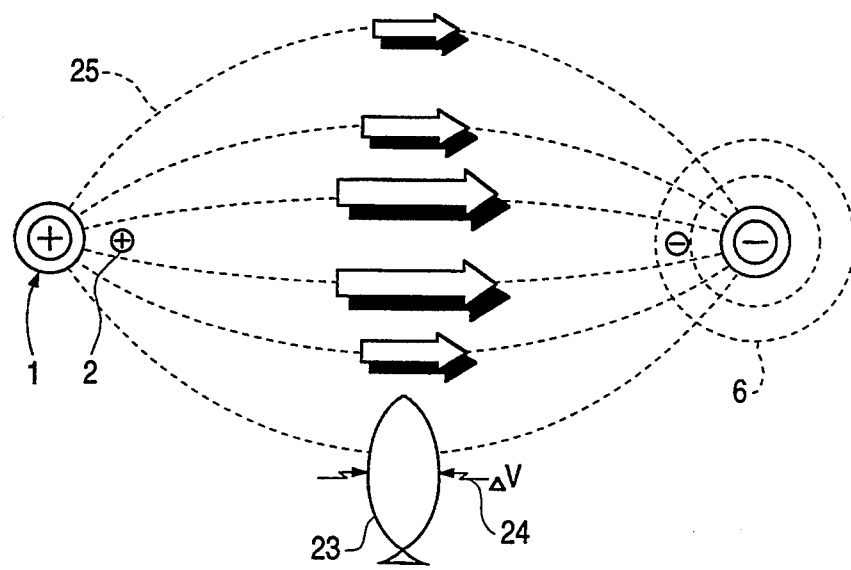
FIG. 4 is a schematic view showing what happens when a fish enters a combined acoustic/electric field (AE field)

FIG. 4 graphically illustrates what happens when a fish 23 enters a parallel acoustic/electric field. The field is produced from a transducer 1 and an electrode 2 (corresponding elements can be found on the right hand side, but are not marked by any reference numerals), these elements establishing the AE fields 25. The fish 23 will then with its side line organs sense the direction of the acoustic part of the field 25, and at the same time feel pain and obtain muscle contractions due to voltage drop 24 (ΔV) across the fish, again due to the electric field lines penetrating the fish body. The bigger the fish 23, the larger the voltage drop 24 across the fish. This indicates that the voltage, frequency and pulse width must be adjusted to the size of the fish.

Again, by changing these parameters, the fence can be adjusted to be effective for fish above a certain size.

Furthermore, the intensity increases as one approaches the center line between the transducers. Around the transducers pressure circles 6 will be created.

Figure 5:
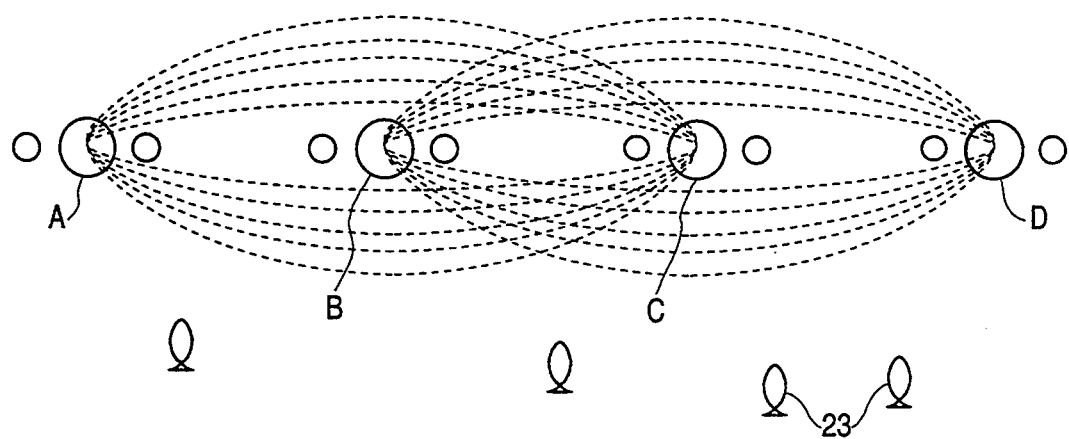
FIG. 5 is a similar view showing overlapping AE fields with every second pulse.

FIG. 5 shows very simply how to establish a relatively homogenous AE field by using overlapping fields, i.e. every other two transducers operate in pairs, and each of these pairs activates every other pulse. This means that transducer columns A and C cooperate in opposite phase and thereafter transducer columns B and D operate in opposite phase, and this takes place in successive order, every other time.

The ideal frequency is 5–7 Hz for each pair, the total frequency from two pairs then being 10–14 Hz.

Figure 6:
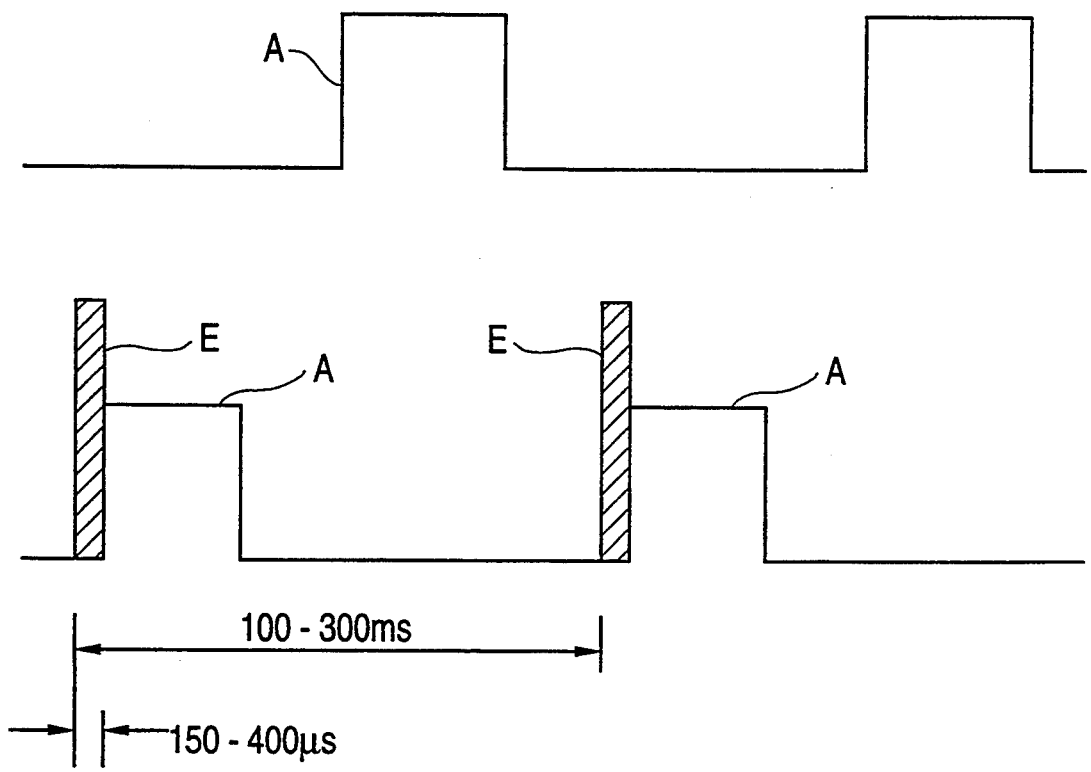
FIG. 6 is a graph showing curve shapes for acoustic and electric pulses.

FIG. 6 shows the time function for the acoustic and electric pulses, for a main row and an additional row. Frequency and width of the pulses are indicated, but not their level.

I claim:

1. A fish fence to be used under water based on low frequency mechanical vibrations in combination with a further stimulus, said fish fence comprising:
    a plurality of electromagnetic low frequency transducers for mechanical vibrations, suspended in vertical columns beneath floats positioned in regular rows in or below the water surface, thus forming a transducer configuration constituting a grid; and
    a corresponding plurality of pairs of parallel-connected electric conductors, each conductor in a said pair of conductors being positioned close to and along each respective side of a vertical transducer column, said further stimulus being an electric field from said conductors, modulated in synchronism with the mechanical vibrations from the transducers.

2. A fish fence according to claim 1, wherein said transducers in a column are arranged in oscillate in phase with each other and in opposite phase with the transducers in the nearest neighboring column in the row, thereby to set up vibration fields as a row of single dipole configurations in the water between said columns of transducers.

3. A fish fence according to claim 1, wherein each said transducer is suspended for a downward acting movement of a vibrating membrane of said transducer.

4. A fish fence according to claim 1, wherein said transducers are connected to a generator for drive voltages, the time behavior of which is adapted by means of a Fourier analysis to give maximized water particle velocity in an area between said columns of transducers.

5. A fish fence according to claim 4, wherein said generator is adapted to generate drive voltages for said transducers by
    I) providing a sinusoidal curve with a topical fundamental frequency,
    II) providing a number of odd harmonic curves with a fundamental sinusoidal curve as a basis, and
    III) adding said odd harmonic curves to said sinusoidal curve with scaling coefficients chosen from a knowledge of physical parameters of said transducers, to create a periodic drive voltage curve with a characteristic time behavior, said characteristic time behavior of said applied drive voltage on each transducer causing an approximate squarewave time function for dynamic pressure in the water outside membranes of said transducers, thereby providing maximum particle acceleration in the water and hence the highest possible particle velocity.

6. A fish fence according to claim 5, wherein said odd harmonic curves comprise the first, third, fifth and seventh harmonic curves.

7. A fish fence according to claim 5, wherein said generator is adapted to deliver said applied drive voltage and the same applied drive voltage in opposite phase to respectively every other column in the row.

8. A fish fence according to claim 1, wherein said grid is in one dimension including columns with only one transducer in each column.

9. A fish fence according to claim 1, wherein said grid is in two dimensions including columns with at least two transducers in each column.

10. A fish fence according to claim 1, further comprising a regular additional row of columns of transducers without associated electrode pairs, said transducers of said additional row being driven in a corresponding manner and from a same generator as said transducers of a first regular row, said additional row in addition to providing its own vibrating dipole fields also being adapted to generate further dipole fields by cooperating with said first row in an area between such two rows, said two rows together forming a three-dimensional grid.

11. A fish fence according to claim 10, wherein said columns of transducers in said first row and in said additional row are laid out in two parallel lines when viewed from above, and in such a manner that each column in one row is positioned at the summit of an equilateral triangle where two neighboring columns in the other row constitute end points of the base line of said triangle, all viewed from above.

12. A fish fence according to claim 1, wherein said electric conductors are positioned in such a manner and have a voltage source arranged in such a manner that the electric field and a mechanical velocity vector field during synchronous operation have substantially the same direction at any point in the water at a distance from said columns and electrodes in the areas therebetween.

13. A fish fence according to claim 12, wherein said electric field is constituted by a row of single dipole configurations in the water between said columns of transducers/conductors.

14. A fish fence according to claim 1, wherein said electric field is separately switchable, independent of mechanical vibrations, as a response on detection of incoming fish.

15. A fish fence according to claim 1, wherein said electric field is active in a short timespan at a leading edge of each periodic mechanical pulse from said transducers, a typical pulse width being 25-75 ms at frequencies of 10-3 Hz, said timespan typically being 150-500 $\mu$s.

* * * * *